Oct. 1, 1963 W. A. TODD 3,105,643
FROZEN CONFECTION DEVICE
Filed March 9, 1962
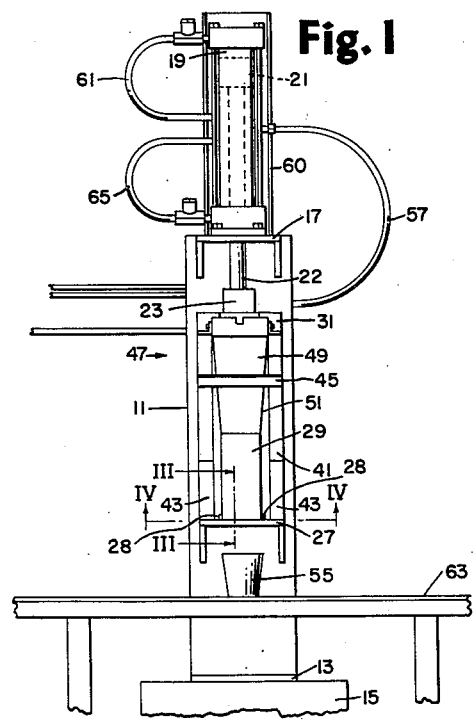
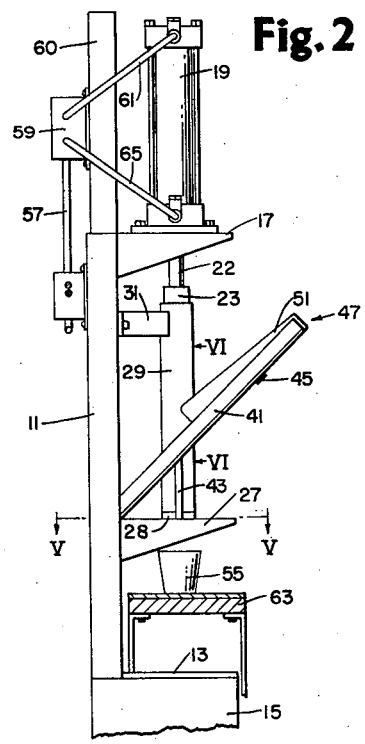
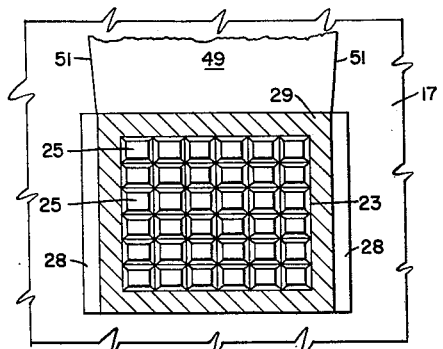
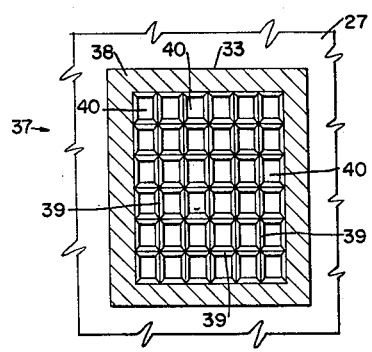
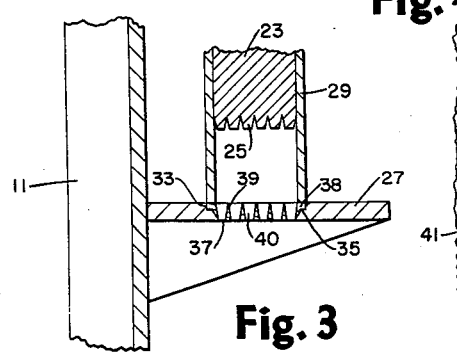
INVENTOR,
WAYNE A. TODD United States Patent Office 3,105,643
Patented Oct. 1, 1963

3,105,643
FROZEN CONFECTION DEVICE
Wayne A. Todd, 1503 Madison Ave., Memphis, Tenn.
Filed Mar. 9, 1962, Ser. No. 178,766
5 Claims. (Cl. 241—95)

This invention relates to a frozen confection device, and more particularly to new and useful improvements in the means for pulverizing ice products and related frozen confections.

It is well known that while prior devices have pulverized ice products for immediate consumption, none has provided for the storage and retention of the pulverized product in the ambient temperature without meltage.

It has additionally been known that while prior devices have been used in the manufacture of pulverized iced confections, none has been capable of producing such an iced confection that could be stored in containers at sub-freezing temperatures with substantially no re-solidification of the pulverized crystalline frozen confection.

The principal object of the present invention is to provide means for the pulverizing of frozen confections and similar ice products.

Another object of the present invention is to provide a combination grid and die means for pulverizing frozen products and the like.

A further object of the present invention is to provide means for pulverizing frozen products in such manner to retard melting in ambient atmosphere.

A further object of the present invention is to provide means for pulverizing frozen products and the like in a manner to prevent re-solidification of the product when the product is stored in sub-freezing containers.

A further object of the invention is to improve the design, construction and efficiency of means for pulverizing frozen products and the like.

The means by which the foregoing and other objects of the present invention are accomplished and the manner of their accomplishment will be readily understood from the following specification upon reference to the accompanying drawings, in which:

FIG. 1 is a front elevational view of a preferred embodiment of the device.

FIG. 2 is a side elevational view of the device of FIG. 1.

FIG. 3 is an enlarged fragmentary vertical sectional view of the device of FIG. 1 as taken on the line III—III of FIG. 1.

FIG. 4 is an enlarged fragmentary inverted sectional plan view of the device of FIG. 1 as taken on the line IV—IV of FIG. 1.

FIG. 5 is an enlarged fragmentary sectional plan view of the device as taken on the line V—V of FIG. 2.

FIG. 6 is a slightly enlarged fragmentary sectional view taken as on the line VI—VI of FIG. 2.

Referring now to the drawings in which the various parts are indicated by numerals, the device of the present invention comprises a substantially vertically disposed flanged column 11, having integrally attached to its foot portion a base member 13 rigidly mounted upon a fixed platform 15. The flanged column 11 is additionally provided at its upper portion with a substantially horizontally disposed centrally bored shelf 17 rigidly connected to the column 11 as by welding or like means. Detachably connected to and mounted on the shelf 17 and extending upwardly therefrom is a hydraulic cylinder 19 provided with reciprocally slidable piston means 21, to which is coupled a downwardly extending piston rod 22. The piston rod 22 depends downwardly from and below the cylinder 19 through the central bore of the shelf 17 and below shelf 17 is rigidly attached to a pulverizing bar 23 of substantially rectangular cross sectional configuration. The pulverizing bar 23 is further provided at its lower extremity with a plurality of inverted evenly spaced frusto pyramidal lugs 25, which as shown taper downwardly in operation. The pulverizing bar 23 is surrounded by and further maintained in rigid perpendicular alinement with the upper shelf 17 and a similar intermediate shelf 27 as by the sleeve 29.

The sleeve 29 is of substantially rectangular cross section internally, similar to the cross sectional size and shape of bar 23 and guidingly and slidably receiving the bar 23. Sleeve 29 is provided at its upper terminus with a pair of oppositely spaced right angular brackets 31 detachably mounted to the flanged column 11 to maintain the sleeve 29 in fixed spaced parallel relation to the column 11.

The intermediate shelf 27 is provided with a pair of oppositely spaced guides 28 to connect sleeve 29 to shelf 27 and additionally contain the sleeve in rigid vertical alinement with the pulverizing bar 23 slidably encased therewithin as best illustrated in FIGS. 1 and 2 of the accompanying drawings. The shelf 27 is further provided with a substatnially rectangular central aperture 33, the aperture being substantially coextensive in area with the base of the sleeve 29. Aperture 33 is undercut around its periphery and thus contains within its inner peripheral limit an integrally formed peripheral rim 35 to support a grid member 37.

Grid 37 comprises a peripheral flange body 38 which fits closely within the undercut part of shelf aperture 33 so as to be supported upon rim 35. Preferably grid body flange 38 is retained in position by a friction fit and the lower end of sleeve 29 seats upon flange 38 when mounted. Grid 37 includes a plurality of knife blades 39 arranged in a first series spanning from side to side of the grid in parallel spaced relation and a second series spanning from front to back of the grid in parallel spaced relation. Blades 39 are disposed with their edges uppermost and intersect to form a plurality of downwardly open apertures or openings 40, and, as the lower parts of the blades are thickened, openings 40 are of downwardly tapered frusto-pyramidal shape arranged to matingly receive lugs 25 of bar 23.

An oppositely substantially parallel pair of braces 41 rigidly attached to the flanged column 11 at the junction of the column 11 and the intermediate shelf 27 extend diagonally upwardly from adjacent the point of juncture and embrace the outer surfaces of the sleeve 29. The braces 41 are further supported and maintained in fixed diagonal attitude as by the vertical arms 43 interposed between the diagonal braces 41 and the intermediate shelf 27, and in substantial parallelism as by the strap 45.

A feed chute 47, rigidly attached to the braces 41 and the strap 45, comprises a base member 49, upstanding downwardly converging side members 51 integrally attached to the base member 49, to provide the means for transporting the frozen product from a storage area (not shown) into the sleeve 29 through the orifice 53 in the sleeve as best illustrated in FIG. 6 of the drawings.

When the frozen product is transported by the chute 47 through the orifice 53 into the sleeve 29 the product is delivered to the upper surfaces of the knives 39 of the grid 37 as by gravity. When the product has been thus deposited upon the grid 37, hydraulic fluid is introduced into the upper end of the cylinder 19 from a suitable source (not shown) through an electrically controlled solenoid detachably affixed to the column 11 into the hose 57. The control valve 59 detachably connected to the auxiliary column 60 directs the hydraulic fluid through the hose 61 into the upper end of the cylinder 19 to propel the piston 21 and the integrally attached pulverizing bar 23 downwardly through the embracing sleeve 29, thus forcing the frozen product downwardly by the inverted pyramids 25 against the knives 39 of the grid 37.

As the piston 21 of the attached bar 23 completes the downwardly directed cycle forcing the frozen product through the openings 40 between the several knives 39 of the grid 37, the tapered outer surfaces of the pyramids 25 compress and pulverize the frozen product as the product is extruded through the tapered openings 40 in the grid 37 formed by the intersecting blades of the knives 39. As the frozen pulverized product emerges from the constricted area of the grid openings into the larger open inner area below the sleeve 29 the granular particles of the frozen product, now free and unconfined, rapidly separate to drop freely as by gravity into the container 55 resting on and carried by the endless conveyor belt 63. The separated frozen particles are surrounded by air, and the air around the separate particles prevents the separate particles from adhering to each other and prevents re-solidification of the product when the container 55 is stored in vaults or bins under sub-freezing conditions.

When the downward cycle of the piston 21 is completed the solenoid 55 diverts the flow of hydraulic fluid through the valve means 59 into the cylinder 19 via the hose 65 into the lower end of the cylinder driving the piston 21 upwardly retracting the bar 23 from the crushing zone of the sleeve 29 to prepare the device for another downward pulverizing stroke.

It will be readily observed from the foregoing specification and the accompanying drawings that the device of the present invention proposes a new and novel means for the transformation of a solid ice product into a pulverized granular frozen confection utilizing the surrounding atmosphere as insulation to prevent the confection from returning to its original solid form when in storage at below freezing temperature, or to retard meltage for extended periods of time when the confection is exposed to the ambient atmosphere.

I claim:

1. A pulverizing device comprising a base, upright supports attached to said base, shelf means affixed to said supports, hydraulic cylinder means mounted upon said shelf means, a piston within said hydraulic cylinder, a pulverizing bar rigidly connected to and driven by said piston, a sleeve, said sleeve guidingly embracing said pulverizing bar, said sleeve provided with an orifice in one of its faces for the reception of a frozen product, said pulverizing bar further provided with a plurality of inverted frusto pyramidal lugs, additional shelf means subjacent said sleeve attached to the aforesaid upright support, said additional shelf means provided with a central aperture, said aperture having an inwardly disposed peripheral rim, a grid firmly seated upon said peripheral rim and embraced by said central aperture, said grid comprising a multiplicity of intersecting knives in evenly spaced relation to provide a like plurality of frusto pyramidal openings between the sides of said knives, and controlled hydraulic fluid means communicated with said cylinder to actuate the aforesaid piston and the extended pulverizing bar means to bear upon the frozen product to compress the said frozen product against the said knives and further extrude the frozen product through the openings between the knives, causing the extruded compressed solid ice product to explode into a granular confection beyond said knives for deposit within a suitable container.

2. A pulverizing device comprising a base, upright supports attached to said base, hydraulic cylinder means, a piston within said cylinder means, a pulverizing bar rigidly connected to and driven by said piston, a sleeve, said sleeve guidingly embracing said pulverizing bar, said sleeve provided with an orifice in one of its faces for the reception of a frozen product, said pulverizing bar further provided with a plurality of inverted frusto pyramidal lugs, shelf means subjacent said sleeve, said shelf means provided with a central aperture, said aperture having an inwardly disposed peripheral rim, a grid firmly seated upon said peripheral rim and embraced by said central aperture, said grid comprising a multiplicity of intersecting knives in evenly spaced perpendicular relation to provide a like plurality of openings between the sides of said knives, and controlled hydraulic fluid means communicated with said cylinder to actuate said piston and the extended pulverizing bar to bear upon the aforesaid frozen product to compress and extrude the said frozen product through the said openings between the said intersecting knives, causing the said compressed frozen product to explode into a granular confection, the said granules being insulated through respective envelopment by the ambient atmosphere.

3. Means for pulverizing frozen products comprising an upright hollow sleeve, a pulverizer bar reciprocally and slidably fitted into said sleeve, operating means extending into the upper end of said sleeve and connected to said pulverizer bar for reciprocating shift of said bar to and from a pulverizing position adjacent the lower end of said sleeve from and to a retracted position adjacent the upper end of said sleeve, said pulverizer bar remote from said operating means carrying a plurality of uniformly spaced lugs of frusto pyramidal shape tapering away from said bar toward said sleeve other end, a grid mounted at said sleeve other end, said grid comprising a multiplicity of uniformly spaced intersecting knife blades disposed with sharpened edges uppermost defining a like plurality of tapered openings positioned in registered alinement with said lugs, said lugs in said pulverizing position mating in said openings and forcing material therethrough, an intake orifice in said sleeve above said grid for reception of material into said sleeve, means for delivering material to said orifice and into said sleeve, said lugs in said retracted position being spaced from said grid and away from said orifice, lug and opening interaction on frozen material positioned therebetween causing explosive extrusion of particles of said material through and beyond said openings in separated comminuted form.

4. Means for pulverizing frozen products comprising a hollow sleeve, a pulverizer bar reciprocally and slidably fitted into said sleeve, operating means extending into one end of said sleeve and connected to said pulverizer bar for reciprocating shift of said bar to and from a pulverizing position adjacent the other end of said sleeve from and to a retracted position adjacent the one end of said sleeve, said pulverizer bar remote from said operating means carrying a plurality of uniformly spaced lugs of frusto pyramidal shape tapering away from said bar toward said sleeve other end, a grid mounted at said sleeve other end, said grid comprising a multiplicity of uniformly spaced intersecting knife blades disposed with sharpened edges facing said lugs defining a like plurality of tapered openings of frusto pyramidal shape positioned in registered alinement with said lugs, said lugs in said pulverizing position mating in said openings and forcing material therethrough, an intake orifice in said sleeve spaced from said grid for reception of material into said sleeve, means for delivering material to said orifice and into said sleeve, said lugs in said retracted position being spaced from said grid and away from said orifice, lug and opening interaction on frozen material positioned therebetween causing explosive extrusion of particles of said material through and beyond said openings in separated comminuted form.

5. Means for pulverizing frozen products comprising a hollow sleeve, a pulverizer bar reciprocally and slidably fitted into said sleeve, operating means extending into one end of said sleeve and connected to said pulverizer bar for reciprocating shift of said bar to and from a pulverizing position adjacent the other end of said sleeve from and to a retracted position adjacent the one end of said sleeve, said pulverizer bar remote from said operating means carrying a plurality of uniformly spaced lugs tapering away from said bar toward said sleeve other end, a grid mounted at said sleeve other end, said grid comprising a multiplicity of uniformly spaced intersecting knife blades disposed with sharpened edges facing said lugs defining a like plurality of tapered openings positioned in registered alinement with said lugs, said lugs in said pulverizing position mating in said openings and forcing material therethrough, an intake orifice in said sleeve spaced from said grid for reception of material into said sleeve, means for delivering material to said orifice and into said sleeve, said lugs in said retracted position being spaced from said grid and away from said orifice, lug and opening interaction on frozen material positioned therebetween causing explosive extrusion of particles of said material through and beyond said openings in separated comminuted form.

References Cited in the file of this patent
UNITED STATES PATENTS

| | | |
|---|---|---|
| 2,318,142 | Cox et al. | May 4, 1943 |
| 2,559,554 | Zahner et al. | July 3, 1951 |